United States Patent
Kim et al.

(10) Patent No.: US 7,302,012 B2
(45) Date of Patent: Nov. 27, 2007

(54) APPARATUS AND METHOD FOR SYMBOL COMBINING IN A MOBILE COMMUNICATION SYSTEM

(75) Inventors: Min-Goo Kim, Suwon-shi (KR); Sang-Hyuck Ha, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 641 days.

(21) Appl. No.: 10/299,225

(22) Filed: Nov. 19, 2002

(65) Prior Publication Data
US 2003/0103585 A1    Jun. 5, 2003

(30) Foreign Application Priority Data
Nov. 19, 2001   (KR)   ............ 10-2001-0071832

(51) Int. Cl.
*H03K 9/00*   (2006.01)
*H04L 27/00*   (2006.01)

(52) U.S. Cl. .............. 375/316; 375/295; 375/340; 375/324; 375/130; 375/146; 375/147; 375/377; 714/748

(58) Field of Classification Search ......... 375/316, 375/295, 340, 324, 130, 146, 147, 377; 714/748
See application file for complete search history.

(56) References Cited

U.S. PATENT DOCUMENTS

| 5,255,127 A * | 10/1993 | Nakatsu et al. ............ 360/29 |
| 6,892,341 B2 * | 5/2005 | Golitschek et al. ......... 714/748 |
| 6,952,561 B1 * | 10/2005 | Kumar et al. ............ 455/63.1 |

FOREIGN PATENT DOCUMENTS

| GB | 2 332 839 | 6/1999 |
| WO | WO 01/37433 | 5/2001 |

OTHER PUBLICATIONS

Kallel, S.; Link, R.; Bakhtiyari, S. "Throughput performance of memory ARQ schemes," IEEE Transactions on Vehicular Technology, vol. 48, No. 3, May 1999 pp. 891-899.*
International Search Report dated Feb. 25, 2003, issued in a counterpart application, namely, Appln. No. PCT/KR02/02162.
I. Martin et al., "New ARQ Based on Code Combining Applicable to HF Channels", HF Radio Systems and Techniques, Conference Publication No. 474 IEE 2000, pp. 285-287.

(Continued)

*Primary Examiner*—David C. Payne
*Assistant Examiner*—Nader Bolourchi
(74) *Attorney, Agent, or Firm*—The Farrell Law Firm

(57) ABSTRACT

An apparatus and method for soft-combining demodulated symbols in a mobile communication system. In the mobile communication system, a transmitting apparatus modulates symbols in different modulation schemes and a receiving apparatus demodulates the modulation symbols in correspondence with the modulation schemes. The soft symbol combining apparatus includes an RWF calculator, an RWF controller, and a soft symbol controller. The RWF calculator calculates an energy of a modulation symbol from each of the modulation schemes and determines relative ratios of the energies to be RWFs for the modulation schemes. The RWF controller multiplies soft metrics of the demodulated soft symbols by the RWFs. Finally, the soft symbol controller combines the multiplied soft metrics.

16 Claims, 9 Drawing Sheets

OTHER PUBLICATIONS

Monica F. Bugallo et al., "A Novel Blind Diversity-Combining Receiver for CDMA Systems", International Symposium on Signal Processing and its Applications, Kuala Lumpur, Malaysia, Aug. 13-16, 2001, vol. 2, pp. 402-405.

Wei Lou et al., "An Efficient ARQ Scheme Using Soft Output Demodulation in Rayleigh Fading Channel", Wireless Communications and Networking Conference, 1999, WCNC 1999, IEEE Published, vol. 3, pp. 1217-1221.

* cited by examiner

APPARATUS AND METHOD FOR SYMBOL COMBINING IN A MOBILE COMMUNICATION SYSTEM

PRIORITY

This application claims priority to an application entitled "Apparatus and Method for Symbol Combining in a Mobile Communication System" filed in the Korean Industrial Property Office on Nov. 19, 2001 and assigned Serial No. 2001-71832, the contents of which are hereby incorporated by reference.

BACKGROUND OF THE INVENTION

1. Field of the Invention

The present invention relates generally to a mobile communication system using a retransmission scheme, and in particular, to an apparatus and method for performing soft symbol combining in a receiver.

2. Description of the Related Art

In general, a receiver performs soft symbol combining to improve reception performance in a mobile communication system using a retransmission scheme (e.g., HARQ: Hybrid Automatic Repeat reQuest).

FIG. 1 illustrates data retransmission using a different modulation scheme and a different code rate for each transmission in a communication system using a retransmission scheme. Referring to FIG. 1, a transmitter transmits data using 16QAM (Quadrature Amplitude Modulation) with a code rate (R) of 1/4 at a first transmission. If a receiver fails to receive the data, it transmits an NACK (Non-Acknowledgement) signal to the transmitter, requesting retransmission of the data. The transmitter then transmits to the receiver additional redundancy information using a different modulation, QPSK (Quadrature Phase Shift Keying) with a code rate of 1/2 at a second transmission (i.e., a first retransmission). The receiver receives the redundancy information and subjects it to soft symbol combining. If the retransmission scheme is CC (Chase Combining), the transmitter transmits the same redundancy information at the retransmission as at the initial transmission. If retransmission scheme is IR (Incremental Redundancy), the transmitter transmits the same or different redundancy information at the retransmission.

Soft Symbol Combining is Performed in Two Ways.

(1) Homogeneous modulation scheme-based soft symbol combining: when initial transmission and retransmission are carried out using the same modulation scheme, the receiver combines soft symbols output from a single demodulator irrespective of initial transmission or retransmission. This soft symbol combining method is adopted in an HARQ system using one modulation_scheme or an HARQ system, which uses a plurality of modulation schemes but maintains the same modulation scheme from an initial transmission of data to the last retransmission of the data.

(2) Heterogeneous modulation scheme-based soft symbol combining: when initial transmission and retransmission are carried out using different modulation schemes, the receiver combines soft symbols output from different demodulators at the initial transmission and retransmission. This soft symbol combining method is adopted in a communication system using an AMCS (Adaptive Modulation and Coding Scheme) and an adaptive HARQ.

The homogeneous modulation scheme and the heterogeneous modulation scheme will be described below in more detail.

FIGS. 2 and 3 are block diagrams of conventional receivers operating according to the homogeneous modulation scheme and according to the heterogeneous modulation scheme, respectively. It is assumed here that a transmitter selects one modulation scheme in an HARQ algorithm at each data transmission. The operation of the transmitter depends on system implementation, and thus its description is not provided here.

Referring to FIGS. 2 and 3, the receivers obtain soft metrics (soft outputs) from demodulators 201-1 and 202-1 (hereinafter, collectively referred to as 201) and demodulators 202-1 and 202-2 (hereinafter, collectively referred to as 202) that operate according to different modulation schemes used for initial transmission and retransmission. Soft symbol controllers 203-1 and 203-2 (hereinafter, collectively referred to as 203) output the arithmetic sum of the soft metrics as a combined soft symbol metric (output) when soft symbol combining is used. The soft symbol controllers 203 rearrange the soft symbols in the original order when soft symbol combining is not used. Though not illustrated, normalization blocks may be disposed between the demodulators 201 and 202 and turbo decoders 204-1 and 204-2 (hereinafter, collectively referred to as 204) in order to prevent overflow caused by fixed-point operation. Normalization can be performed in many well-known methods and thus it will not be described here.

Because the receiver illustrated in FIG. 2 operates according to the homogeneous modulation scheme, the demodulators 201-1 and 202-1 support the same modulation scheme, QPSK. On the other hand, since the receiver illustrated in FIG. 3 operates according to the heterogeneous modulation scheme, the demodulators 201-2 and 202-2 support different modulation schemes, QPSK and 16QAM, respectively. The demodulators 201 demodulate initial transmission data and the demodulators 202 demodulate retransmission data. When the soft symbol controllers 203 start to operate, the outputs of the demodulators 201 and 202 are provided simultaneously. While the receiver supports two modulation schemes in FIG. 3 for illustrative purposes, it can be expanded to support more modulation schemes by using more demodulators.

The demodulators illustrated in FIGS. 2 and 3 can output soft metrics in many ways (e.g., by DMM (dual minimum metric) provided in "Evaluation Methodology", a system simulation guidebook presented by the 3GPP2 ($3^{rd}$ Generation Partnership Project 2), or by maximum likelihood metric to minimize errors). The present invention can be implemented with use of any soft metric generation method. Here, DMM will be adopted by way of example.

In the conventional soft symbol combining method as illustrated in FIGS. 2 and 3, irrespective of modulation schemes used for an initial transmission and retransmissions, a soft metric is obtained independently according to a corresponding modulation scheme for each transmission. Then the soft symbol controllers 203 operate differently, depending on whether soft symbol combining is used or not. Specifically, the two demodulators 201 and 202 directly feed soft metrics to the soft symbol controllers 203. If soft symbol combining is used, the soft symbol controllers 203 arithmetically calculate the average of the two soft metrics. If soft symbol combining is not used, the soft symbol controllers 203 rearrange soft symbols.

In view of the nature of turbo codes and the performance of a MAP (Maximum A Posteriori) decoder, a LogMAP decoder, and a MaxLogMAP decoder used as the turbo decoders 204, the following considerations must be taken into account in the above direct soft metric feeding from demodulators using different modulation schemes to a turbo decoder.

In general, a channel reliability $L_c$ is multiplied with an input soft metric during turbo decoding in a turbo decoder 204 illustrated in FIG. 2 or 3. In an AWGN (Additive White Gaussian Noise) environment, the channel reliability $L_c=4E_b/N_o$ and increases proportionally to the SNR (Signal-to-Noise Ratio) of the channel. Thus, representing the reliability of the soft symbol, the channel reliability $L_c$ is a kind of weighting factor that varies with the quality of the soft symbol when the turbo decoder 204 performs MAP decoding. If the SNR changes, therefore, this weighting factor is changed. Because the target SNR of the AWGN channel is preset, the channel reliability $L_c$ is determined according to the target SNR.

The channel reliability $L_c$ is a very significant factor to the MAP decoder. It is well known that an estimation error (e.g., overestimation or underestimation) of the channel reliability $L_c$ greatly degrades decoding performance. To minimize the performance degradation, a MaxLogMAP decoder is used instead of the MAP decoder.

If a signal processed by the homogenous modulation scheme is transmitted on a static channel such as AWGN, there is no change in the channel reliability $L_c$. Therefore, the soft symbol controller 203-1 simply calculates the average of soft metrics from the demodulators 201-1 and 202-1 in the receiver illustrated in FIG. 2 because the channel reliability of the soft metrics are identical.

In the heterogeneous modulation scheme, however, the channel reliability L, is different for different modulation schemes. For example, if a QPSK soft metric is combined with an 8PSK or 16QAM soft metric, the modulation schemes have different channel reliabilities. In order to optimize decoding performance, the soft metrics must be weighted according to the channel reliabilities of the modulation schemes for the same reason that the channel reliabilities $L_c$ are weighted according to channel condition in a turbo decoder as stated above.

When a 16QAM soft metric is combined with a QPSK soft metric in actual implementation, weighting the soft metrics at a ratio of 1:3 (16QAM:QPSK) produces an about 0.8 dB gain increase which might not otherwise be obtained. Here, combining covers both soft symbol combining and symbol rearrangement. Consequently, soft metrics must be weighted according to channel reliability when they are from heterogeneous demodulators. In fact, the conventional symbol combining method focuses mainly on symbol combining of homogenous symbols. Even when it deals with symbol combining of heterogeneous symbols, the same channel reliability $L_c$ is simply applied without weighting during turbo decoding. As a result, decoding performance is degraded.

SUMMARY OF THE INVENTION

It is, therefore, an object of the present invention to provide an apparatus and method in a receiver for assigning reliability weight factors (RWFs) to soft metrics output from demodulators in a mobile communication system using different modulation schemes.

To achieve the above and other objects, an apparatus and method for soft-combining demodulated symbols in a mobile communication system are provided. In the mobile communication system, a transmitting apparatus modulates symbols in different modulation schemes and a receiving apparatus demodulates the modulation symbols in correspondence with the modulation schemes. The soft symbol combining apparatus includes an RWF calculator, an RWF controller, and a soft symbol controller.

According to one aspect of the present invention, the RWF calculator calculates RWFs for the modulation schemes. The RWF controller multiplies the demodulated soft symbols by the RWFs. The soft symbol controller combines the multiplied values.

According to another aspect of the present invention, the RWF calculator calculates an LLR (Log Likelihood Ratio) of a modulation symbol from each of the modulation schemes and determines relative ratios of the LLRs to be RWFs for the modulation schemes. The RWF controller multiplies the soft metrics of the demodulated symbols by the RWFs. The soft symbol controller combines the multiplied soft metrics.

According to a further aspect of the present invention, the RWF calculator calculates an SNR of a modulation symbol from each of the modulation schemes and determines relative ratios of the SNRs to be RWFs for the modulation schemes. The RWF controller multiplies the soft metrics of the demodulated symbols by the RWFs. The soft symbol controller combines the multiplied soft metrics.

According to still another aspect of the present invention, the RWF calculator calculates an energy of a modulation symbol from each of the modulation schemes and determines relative ratios of the energies to be RWFs for the modulation schemes. The RWF controller multiplies the soft metrics of the demodulated symbols by the RWFs. The soft symbol controller combines the multiplied soft metrics.

According to yet another aspect of the present invention, the RWF calculator calculates an amplitude of a modulation symbol from each of the modulation schemes and determines relative ratios of the amplitudes to be RWFs for the modulation schemes. The RWF controller multiplies the soft metrics of the demodulated symbols by the RWFs. The soft symbol combiner combines the multiplied soft metrics.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

The following description is made with the appreciation that the present invention is not limited to HARQ, but pertains to soft symbol combining or symbol rearrangement of demodulator outputs irrespective of whether the inputs of demodulators are all initial transmission data, retransmission data, or both initial transmission and retransmission data, and whether the demodulators demodulate simultaneously or sequentially. Terms "homogeneous" and "heterogeneous" are used herein to indicate use of the same modulation scheme and use of different modulation schemes, respectively.

Figure 4:
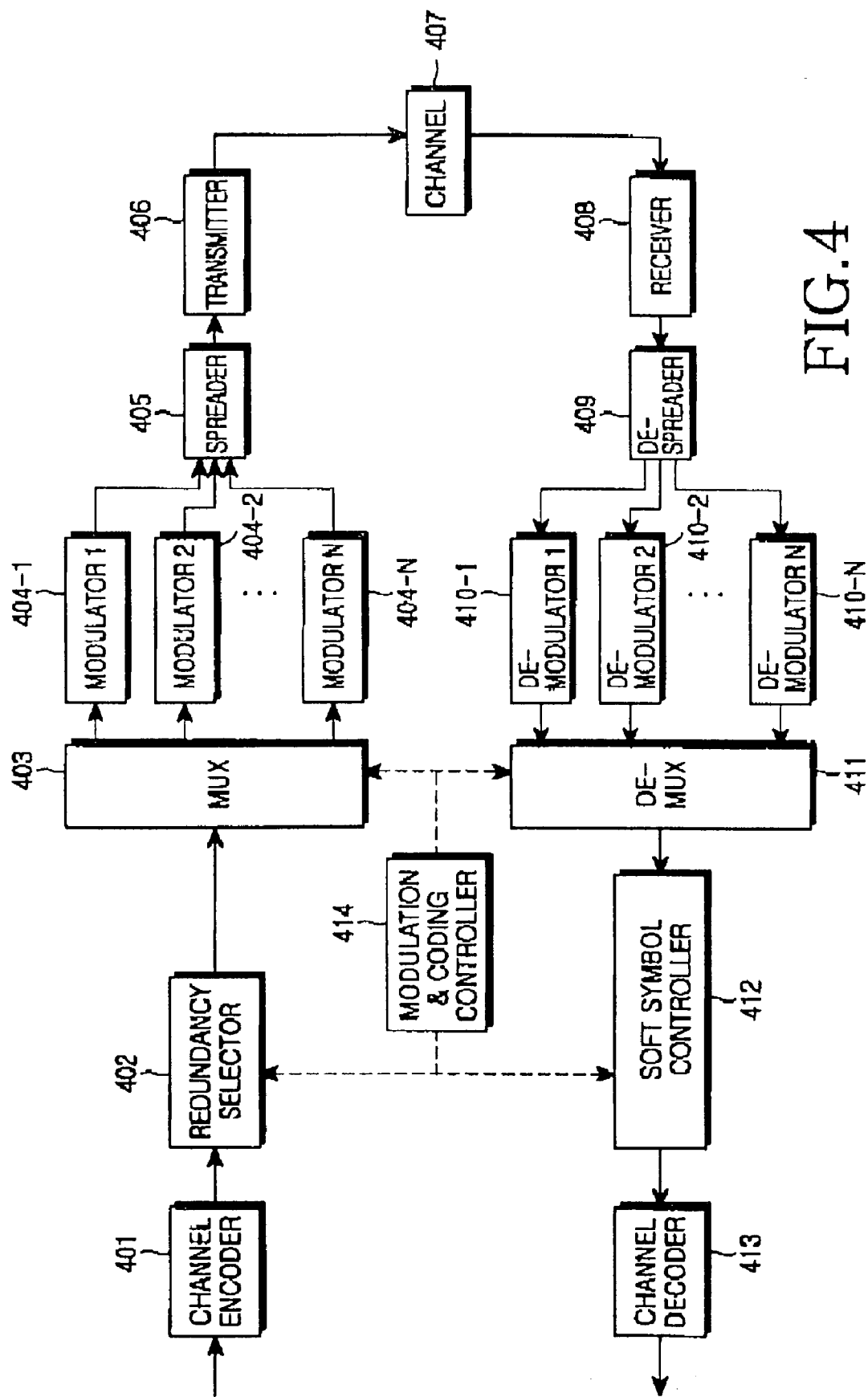
FIG. 4 is a block diagram of a transmitting apparatus and a receiving apparatus using a plurality of modulation schemes, to which the present invention is applied.

FIG. 4 is a block diagram of a transmitting apparatus and a receiving apparatus using a plurality of modulation schemes, to which the present invention is applied. Referring to FIG. 4, in the transmitting apparatus, a channel encoder 401 generates forward error correction codes (FECs) to correct errors in a channel 407. A redundancy selector 402 selects redundancy information according to a code rate in a given redundancy selection method, upon request for data retransmission. CC (Chase Combining) and IR (Incremental Redundancy) are implemented usually by use of the redundancy selector 402. A multiplexer (MUX) 403 outputs the redundancy information to a modulator using a modulation scheme corresponding to the current transmission among a plurality of modulators 404-1 to 404-N. The modulator modulates the redundancy information in its modulation scheme. A spreader 405 spreads the modulated symbol with a predetermined spreading code if the system is a CDMA (Code Division Multiple Access) system. A transmitter 406 upconverts the spread signal to an RF (Radio Frequency) signal suitable for transmission and transmits the RF signal on the channel 407.

The receiving apparatus operates in the reverse order of the transmitting apparatus. A receiver 408 downconverts an RF signal received on the channel 407 to a baseband signal. A despreader 409 despreads the baseband signal with a predetermined spreading code. Demodulators 410-1 to 410-N demodulate the spread signal according to their demodulation schemes. A demultiplexer (DEMUX) 411 selectively feeds the outputs of the demodulators 410-1 to 410-N to a soft symbol controller 412. The soft symbol controller 412 combines soft metrics received from the DEMUX 411 when soft symbol combining is used, and rearranges code symbols (i.e., redundancy information) in the original order when soft symbol combining is not used. A channel decoder 413 decodes the output of the soft symbol combiner 412. A modulation & coding controller 414 commonly controls the transmitting and receiving apparatuses. The modulation & coding controller 414 selects a code rate, redundancy information, and a modulation scheme and correspondingly controls the redundancy selector 402, the soft symbol controller 412, the MUX 403, and the DEMUX 411. to the criteria for making the selection is dependent on system implementation and thus its detailed description is not provided here. The soft symbol controller 412, which is the main feature of the present invention, will be described later in more detail.

Figure 5:
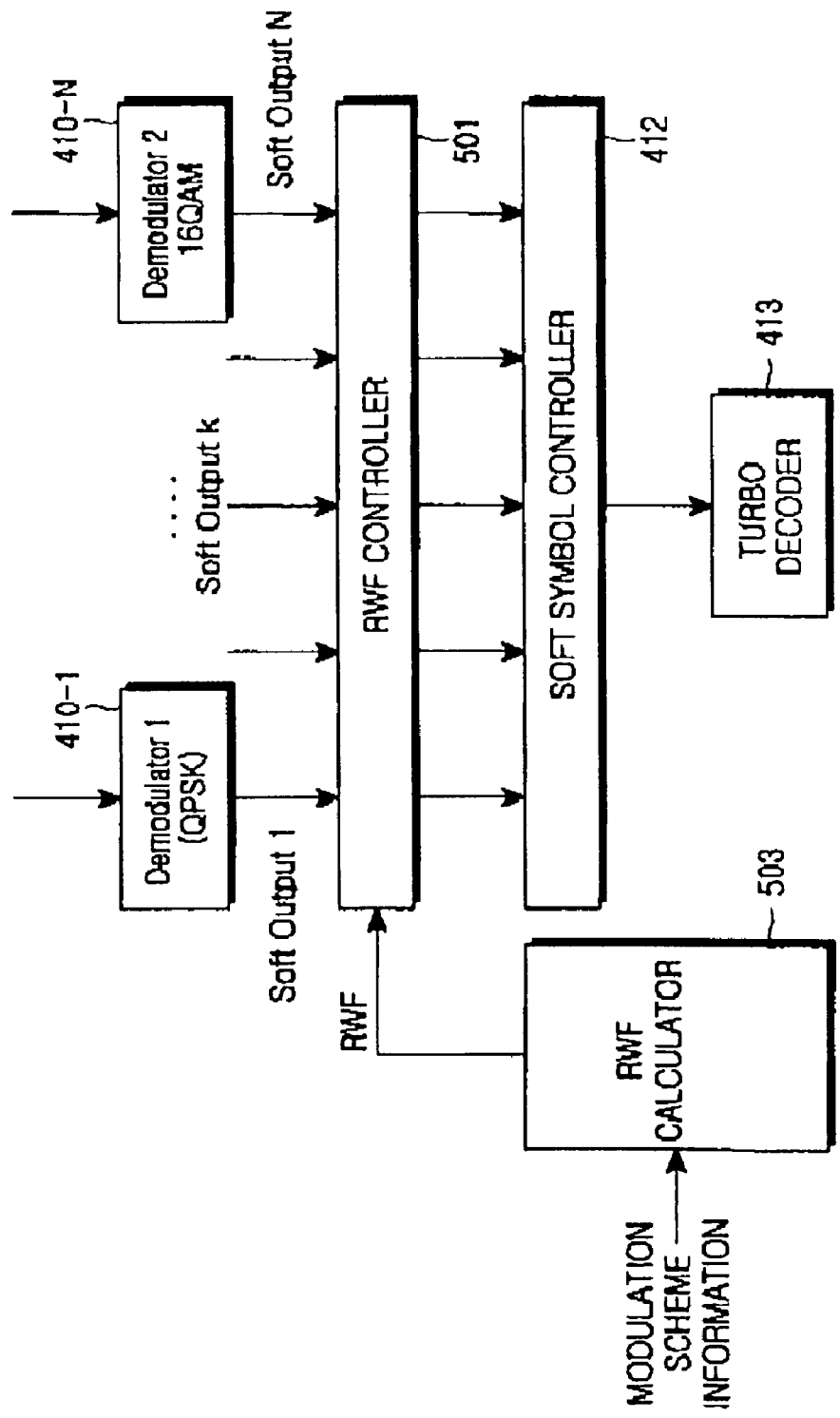
FIG. 5 is a block diagram of an apparatus for combining soft metrics from a plurality of demodulators in a heterogeneous modulation-based system according to an embodiment of the present invention.

FIG. 5 is a block diagram of an apparatus for combining soft metrics output from a plurality of demodulators in a heterogeneous modulation-based system according to an embodiment of the present invention. Referring to FIG. 5, the demodulators 410-1 to 410-N demodulate a signal received from the despreader 409 illustrated in FIG. 4 in different demodulation schemes. For example, the demodulator 410-2 demodulates in QPSK, and the demodulator 410-N demodulates in 16QAM. An RWF calculator 503 calculates an RWF to be assigned to a soft metric from each demodulator. The RWF is a constant fixed for the demodulator for as long as the demodulator uses the same modulation scheme. An RWF controller 501 multiplies soft metrics from the demodulators 410-1 to 410-N by RWFs assigned to the respective soft metrics. The soft symbol controller 412 combines a plurality of soft metrics received from the RWF controller 501 and feeds the combined soft metric to the channel decoder 413. Here, a turbo decoder is used as the channel decoder 413.

According to the embodiment of the present invention, when different modulation schemes are used, the receiving apparatus is provided with the RWF controller 501 to control a relative channel reliability L, for each demodulator. The RWF controller 501 functions to reflect channel reliabilities in the soft metrics received from the demodulators 410-1 to 410-N to achieve optimum decoding performance in the turbo decoder 413, after soft symbol combining in the soft symbol controller 412. In other words, the RWF controller 501 controls weighting factors. The weighting factors are determined according to the modulation schemes and the SNRs of modulation symbols.

Methods of obtaining RWFs will be described herein below.

As illustrated in FIG. 5, calculation of RWFs is most significant in weighting soft metrics from demodulators in a receiver that operates according to a heterogeneous modulation scheme. The RWFs for soft metrics from the demodulators are calculated such that demodulated symbols corresponding to different modulation schemes have equal reliability prior to turbo decoding. The RWF calculator 503 performs the RWF calculation. RWF calculation can be implemented in soft ware, or in hard ware (e.g., a look-up table (LUT) or a circuit). When RWFs are calculated utilizing soft ware, a program for invoking an RWF calculation formula may be stored in a ROM (Read Only Memory). The RWF controller 501 multiplies the RWFs by corresponding soft metrics. The RWF controller 501 can also be implemented in hardware (e.g., a calculator) or in soft ware (e.g., a program).

Figure 6:
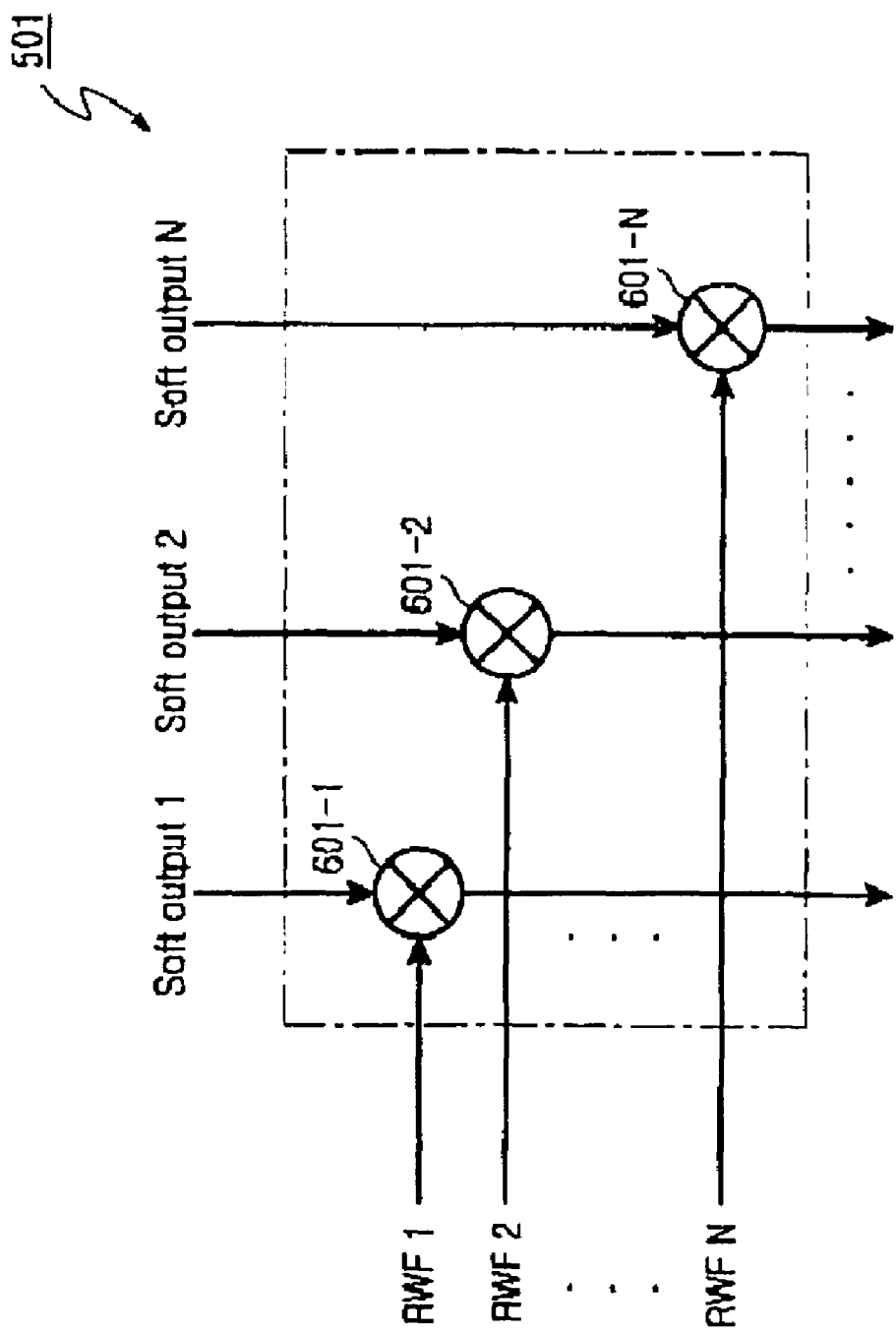
FIG. 6 illustrates a reliability weighting factor (RWF) controller illustrated in FIG. 5.

FIG. 6 illustrates an embodiment of the RWF controller 501 according to the present invention. Referring to FIG. 6, the RWF controller 501 includes as many multipliers 601-1 to 601-N as the demodulators 410-1 to 410-N illustrated in FIG. 5. The multiplier 601-1 multiplies a soft metric received from the first demodulator 410-1 by an RWF (RWF 1) received from the RWF calculator 503 and the multiplier 601-2 multiplies a soft metric received from the second demodulator 410-2 by an RWF (RWF 2) received from the RWF calculator 503. In the same manner, the multiplier 601-N multiplies a soft metric received from the Nth demodulator 410-N by an RWF (RWF N) received from the RWF calculator 503. That is, the RWF controller 501 multiplies soft metrics from the demodulators 410-1 to 410-N by RWFs assigned to the respective soft metrics.

As stated above, in the present invention, it is preferable to weight a 16QAM soft metric and a QPSK soft metric at a ratio of 1:3. Also, the weighting ratio is similar to the transmitted signal amplitude ratio 1:3.16 (=√10:1) of the modulation schemes. This implies that the SNRs of modulation symbols from different modulation schemes are closely related to their channel reliabilities $L_c$. Related simulation results will be described below.

If an initial transmission and a retransmission are carried out according to a heterogeneous modulation scheme, application of a common RWF to heterogeneous soft metrics without considering different modulations leads to performance degradation during turbo decoding, as described above. A simulation using the same number of Walsh codes at the initial transmission and retransmission has revealed that weighting an 8PSK soft metric and a QPSK soft metric with an RWF of ⅓ and an RWF of ¼, respectively, results in the best performance in turbo decoding. Table 1 and Table 2 illustrate the results of this simulation.

TABLE 1

| RWF | BWR | PER |
| --- | --- | --- |
| 2 | 2.42e–03 | 3.40e–02 |
| 2.8 | 1.90e–03 | 2.40e–02 |
| 2.9 | 1.60e–03 | 2.10e–02 |
| 2.95 | 1.45e–03 | 1.90e–02 |
| 3 | 1.46e–03 | 1.90e–02 |
| 3.1 | 1.66e–03 | 2.40e–02 |
| 3.16 | 1.80e–03 | 2.50e–02 |
| 4 | 3.43e–03 | 3.50e–02 |

TABLE 2

| RWF | BWR | PER |
| --- | --- | --- |
| 2 | 4.21e–03 | 2.40e–02 |
| 3 | 4.15e–03 | 1.70e–02 |
| 3.8 | 5.44e–03 | 1.50e–02 |
| 3.9 | 8.28e–03 | 1.20e–02 |
| 3.95 | 8.01e–03 | 1.20e–02 |
| 3.97 | 7.77e–03 | 1.20e–02 |
| 4 | 1.05e–03 | 1.50e–02 |
| 4.2 | 1.10e–03 | 1.80e–02 |

Referring to Table 1, when an initial transmission is carried out in 16QAM and a retransmission is carried out in QPSK, with the same transmission power, when an RWF for QPSK with respect to 16QAM is 3 or its approximate value (e.g., 2.95 or 3), the lowest PER (Packet Error Rate), 1.90e-02 is obtained.

Referring to Table 2, when an initial transmission is carried out in 8PSK and a retransmission is carried out in QPSK, with the same transmission power, when an RWF for QPSK with respect to 8PSK is an approximate value to 4 (e.g., 3.9, 3.95, or 3.97), the lowest PER, 1.20e-02 is obtained.

Taking the simulation results into account, the following RWF calculation methods are proposed. They can be selectively used according to implementation complexity and performance. A combined use of the RWF calculation methods is available depending on a system. A detailed description of new RWF calculation methods produced by combining the proposed ones is not given here.

Method 1

In a first method, RWFs are calculated using a ratio of the SNRs, energies, or amplitudes of modulation symbols from different modulation schemes. For example, if the SNR of a QPSK modulation symbol is A and that of a 16QAM modulation symbol is B, their RWF ratio is A:B. Here, A and B are linear.

Also, RWFs can be calculated according to the amplitudes of modulation symbols, for example, by Eq. (1) below. In Eq. (1), the numerator represents the amplitude of a modulation symbol from a modulation scheme A. The denominator represents the amplitude of a modulation symbol from a modulation scheme B.

Alternatively, RWFs can be calculated based on the energies of modulation symbols, for example, by Eq. (2) below. In Eq. (2), the numerator represents the energy of a modulation symbol from the modulation scheme A. The denominator represents the amplitude of a modulation symbol from the modulation scheme B.

$$RWF = \left[ \frac{\frac{1}{L}\sum_{k}^{L} \left(\sqrt{X_k^2 + Y_k^2}\right) \text{Modulation } A}{\frac{1}{L}\sum_{k}^{L} \left(\sqrt{X_k^2 + Y_k^2}\right) \text{Modulation } B} \right] \quad (1)$$

$$RWF = \left[ \frac{\frac{1}{L}\sum_{k}^{L} (X_k^2 + Y_k^2) \text{Modulation } A}{\frac{1}{L}\sum_{k}^{L} (X_k^2 + Y_k^2) \text{Modulation } B} \right] \quad (2)$$

Figure 7:
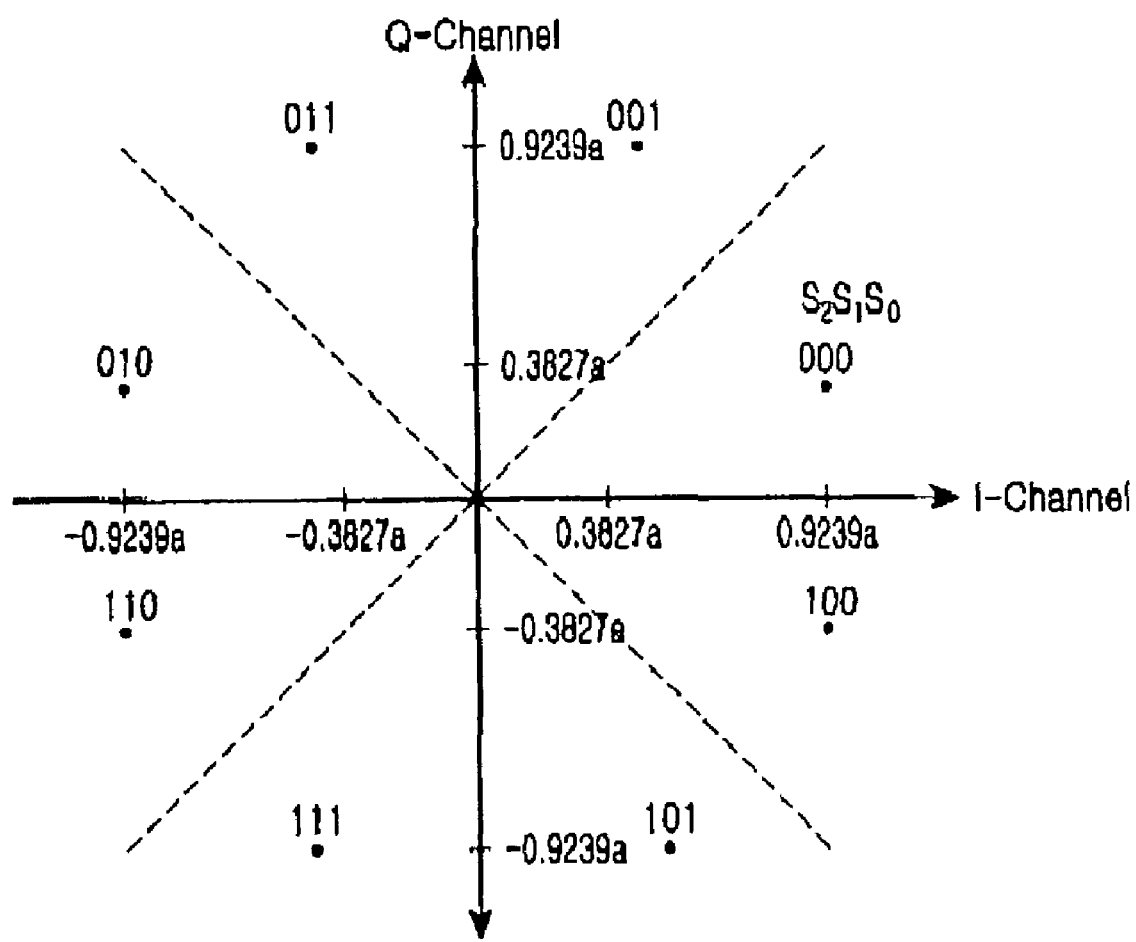
FIG. 7 illustrates an 8PSK signal constellation.

The above equation 1 represents a theoretical process that amplitudes of L modulation symbols are respectively calculated based on the modulation scheme A and then the amplitudes of L modulation symbols are also calculated based on the modulation scheme B, thereby calculating RWFs, wherein a variable L denotes the number of modulation symbols to be measured for the purpose of comparison to the amplitude, and variables $X_k$ and $Y_k$ denote an in-phase component value and a quadrature-phase component value of a k-th modulation symbol, respectively. For example, a phase component value of a modulation symbol $S_k$ corresponding to a X-axis defined as I-Channel in FIG. 7 is represented as $X_k$, while a phase component value of the modulation symbol Sk corresponding to a Y-axis defined as Q-Channel is represented as $Y_k$. That is, one modulation symbol Sk may be represented in the form of ($X_k$, $Y_k$) on the orthogonal coordinate. Thus, as seen in the equation 1, it should be noted that a series of operations, i.e., squaring $X_k$ and $Y_k$, adding the squared values to each other and then calculating a square root with respect to the added result is identical with a process of calculating a distance from the center to a location of a given symbol using the orthogonal coordinate.

In equation 2, variables L, $X_k$ and $Y_k$ are substantially same as those defined in equation 1. However, the equation 2 indicates an alternative process, quite different from that of the equation 1 that energies of the modulation symbols are calculated by each modulation scheme and then RWFs are calculated therefrom. According to this process, instead of calculating a square root with respect to a squared sum of $X_k$ and $Y_k$, the squared results are added to each other, so that an average energy for respective modulation schemes is calculated to be used as a factor for calculating the RWFs.

Method 2

In a second method, RWFs are calculated using an average LLR (Log Likelihood Ratio) or soft metric ratio of a plurality of code symbols mapped to a modulation symbol from each modulation scheme. In QPSK, two code symbols s0 and s1 are mapped to one modulation symbol and the average LLR, Avg_LLR (QPSK), of the two code symbols s0 and s1 is calculated. In 8PSK, three code symbols s0, s1, and s2 are mapped to one modulation symbol as illustrated in FIG. 7 and the average LLR, Avg_LLR (8PSK), of the three code symbols s0, s1, and s2 is calculated. In 16QAM, four code symbols s0, s1, s2 and s3 are mapped to one modulation symbol and the average LLR, Avg_LLR (16QAM), of the four code symbols s0, s1, s2, and s3 is calculated. In the same manner, the average LLR, Avg_LLR (64QAM), of code symbols mapped to a 64QAM modulation symbol is calculated. Ratios of the calculated average LLRs are used as RWFs. This is expressed as $$RWF = \frac{1}{LM}\sum_{k=1}^{L}\sum_{i=0}^{m-1} \text{Soft\_Metric}(k, i) \quad (3)$$

$$= \frac{1}{LM}\sum_{k=1}^{L}\sum_{i=0}^{m-1} K\log\left(\frac{Pr\{s_{k,i} = 1 \mid X_k, Y_k\}}{Pr\{s_{k,i} = 0 \mid X_k, Y_k\}}\right)$$

The above equation 3 represents a process that a Soft_Metric (k, i) with respect to L number of modulation symbols is calculated, and then RWFs are calculated, wherein a variable L denotes the number of the modulation symbols to be measured for the purpose of comparison to the amplitude size, and a variable M denotes a code bit constituting one symbols. For example, M is 3 in FIG. 7. That is, one modulation symbol $S_k$ consists of three code symbols, $Sk_0$, $S_{k1}$, $S_{k2}$. In the equation 3, $X_k$ and $Y_k$ denotes an in-phase component value and a quadrature-phase component value of the k-th modulation symbol, respectively. For example, a phase component value of a modulation symbol $S_k$ corresponding to a X-axis defined as I-Channel in FIG. 7 is represented as $X_k$, and a phase component value of a modulation symbol $S_k$ corresponding to a Y-axis defined as Q-Channel is represented as $Y_k$. That is, one symbol $S_k$ may be represented inf the form of $(X_k, Y_k)$ using the orthogonal coordinate. Also, in the equation 3, Pr{A|B,C} represents a probability of the occurrence of an event A under a condition that both an event B and an event C occur. K is a constant for normalization. Factors, i and k represents an order of the code symbols and modulation symbols, respectively. The equation 3 represents a process of calculating a probability that respective code symbols of the kth modulation symbols, $X_k$ and $Y_k$ become "0" or "1", so that a soft matric is calculated from the calculated probability value and then the RWFs are calculated from an average value of the soft metric.

Method 3

In a third method, RWFs are calculated by simplifying or approximating Eq. (3). For example, Eq. (3) is wholly approximated or only Soft_Metric (k, i) is approximated. The approximation of Eq. (3) will be described later.

Method 4

Due to the complexity of Eq. (3), RWFs resulting from a simulation (e.g., Table 1 and Table 2) are used consistently. This method will be described later in more detail.

Figure 8:
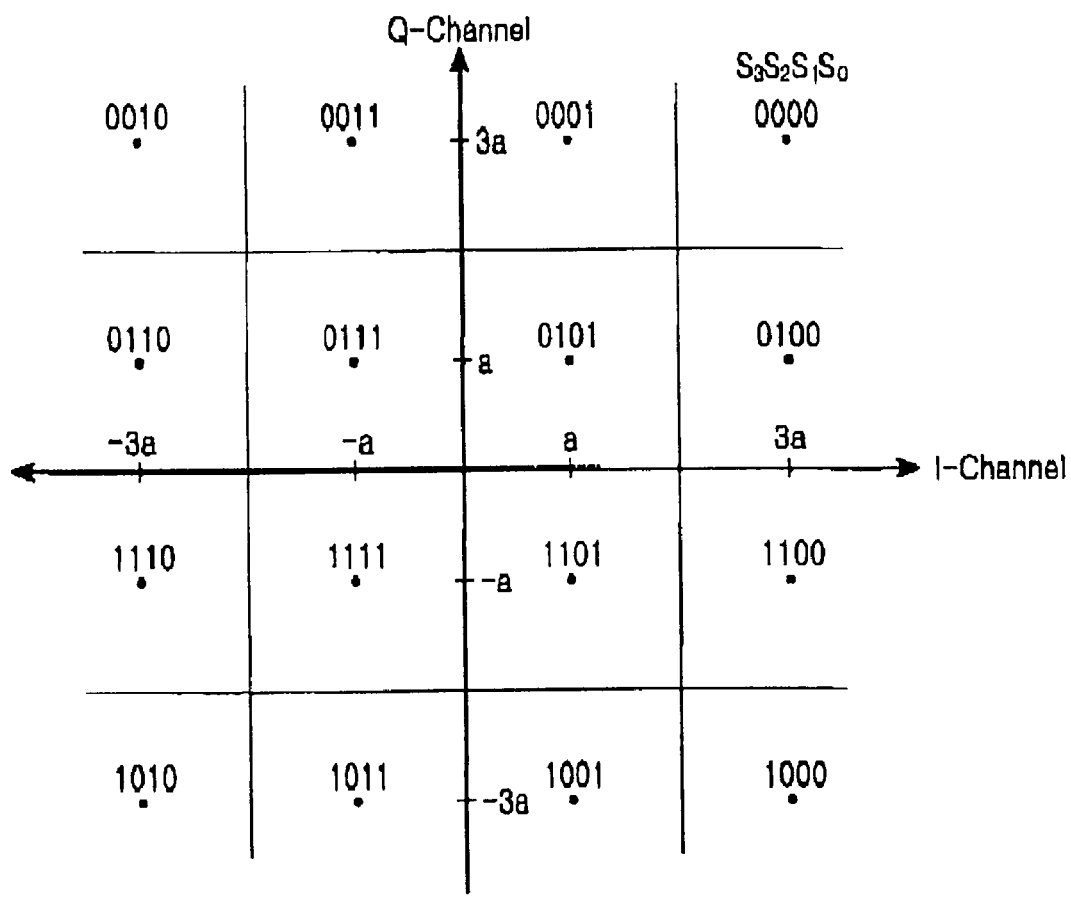
FIG. 8 illustrates a 16QAM signal constellation.

FIGS. 7 and 8 illustrate signal constellations for 8PSK and 16QAM, respectively. As illustrated, m coded bits are mapped to a modulation symbol in each modulation scheme.

As in Eq. (3), the soft metric or LLR $\Lambda(S_{k,1})$ of a code bit $S_{k,1}$ (i=0, 1, ..., m−1) is calculated by $$\Lambda(s_{k,i}) = K\log\frac{Pr\{s_{k,i} = 1 \mid X_k, Y_k\}}{Pr\{s_{k,i} = 0 \mid X_k, Y_k\}}, \quad i = 0, 1, ..., m-1 \quad (4)$$

where K is a constant and Pr{A|B} is a conditional probability defined as the probability of the occurrence of an event A when an event B occurs. $X_k$ and $Y_k$ denote the X-axis (I channel) and Y-axis (Q channel) coordinates of a received symbol in FIGS. 7 and 8. According to communication theory, $X_k$ and $Y_k$ represent the in-phase and quadrature-phase signal components of the symbol, respectively. Since Eq. (4) exhibits non-linear characteristics and requires a relatively large volume of computation, a simple algorithm for approximating Eq. (4) is usually adopted in actual implementation. Soft metric calculation using Eq. (4) is well known and thus its description is not provided here. Yet, for better understanding of the present invention, methods of approximating Eq. (4) will be described.

When an M-ary QAM and an 8PSK are adopted, one of the approximation methods is DMM. Even for an M-ary QAM and an M-ary PSK that have relatively high modulation orders, soft metrics can be obtained using Eq. (4).

In 16QAM, for example, the soft metrics or LLRs of code bits as calculated by Eq. (4) are approximated by Eq. (5). because Eq. (5) is valid only in an AWGN channel environment, appropriate compensation is required in a fading channel environment where the SNR of a received signal varies moment to moment.

$$\Lambda(s_{k,1}) = X_k$$

$$\Lambda(s_{k,0}) = |X_k| - 2a$$

$$\Lambda(s_{k,3}) = Y_k$$

$$\Lambda(s_{k,2}) = |Y_k| - 2a \quad (5)$$

where, "a" means a distance from the center on the orthogonal coordinate.

In 8PSK, the soft metrics or LLRs of code bits as calculated by Eq. (4) is approximated by $$\Lambda(s_{k,2}) = Y_k \quad (6)$$

$$\Lambda(s_{k,1}) = X_k$$

$$\Lambda(s_{k,0}) = 1 - \left|\frac{Y_k}{X_k}\right|$$

As noted from Eq. (5) and Eq. (6), although coded bits are from the same received symbol $(X_k, Y_k)$, they have different soft metrics. "The same received symbol" is used in the sense of the same modulation symbol energy or the same modulation symbol SNR. Thus, it can be concluded that the soft metrics of coded bits are different according to modulation schemes even if they are from the same received symbol.

Eq. (5) and Eq. (6) can be used for approximation in Method 3. In accordance with the embodiment of the present invention including Method 1, Method 2, and Method 3, if one modulation scheme is used-and the SNRs of modulations symbols are equal, a predetermined RWF is applied to the soft metric of each of the code bits from the modulation symbols. For example, in 8PSK, an RWF of $4E_b/N_o$ (=L,) is applied. On the other hand, if different modulation schemes are used, RWFs for heterogeneous symbols are calculated and heterogeneous soft metrics are weighted with the RWFs in the following steps.

Step 1: an average soft metric is calculated for each modulation scheme;

Step 2: a relative ratio of the average soft metrics is calculated; and

Step 3: the relative soft metric ratios are applied as RWFs to soft metrics output from demodulators.

While optimum RWFs can be achieved by developing equations from the above steps, the equation development requires high accuracy and is very complicated. In addition, errors may be involved with approximation of solutions to the equations.

It can be further contemplated as another embodiment that instead of Step 1, the average of soft metrics output from demodulators corresponding to different modulation schemes is calculated on the assumption that modulation symbols from the different modulation schemes are transmitted with the same power in an AWGN channel environment with the same channel noise. The second embodiment of the present invention corresponds to Method 4. This method is advantageously accurate when errors are generated in equations because RWFs are obtained from a simulation as illustrated in Table 1 and Table 2.

Figure 9:
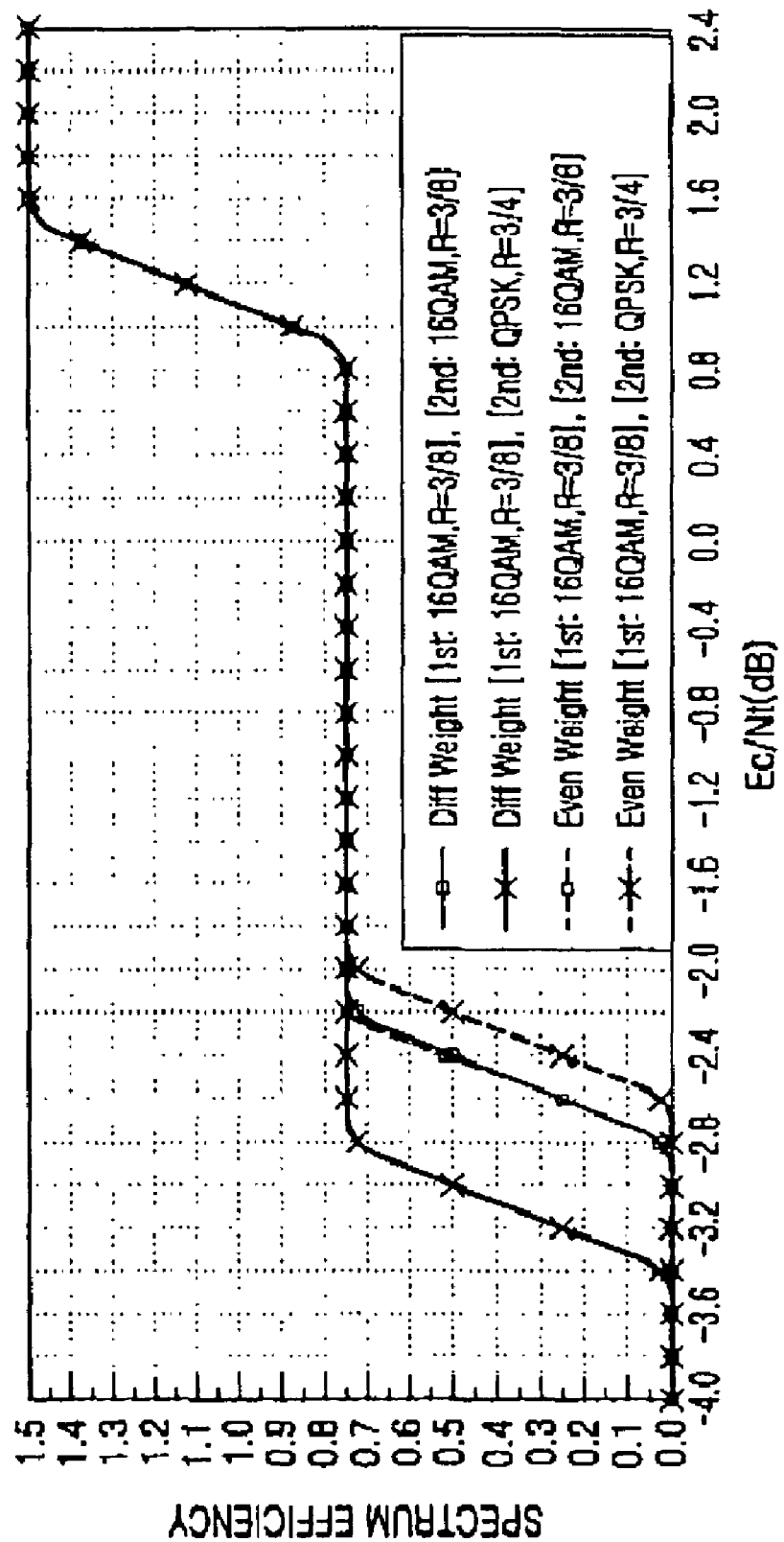
FIG. 9 illustrates graphs comparing the performances of homogeneous modulation and heterogeneous modulation according to whether RWF is applied or not.

FIG. 9 illustrates graphs showing a performance comparison between a homogeneous modulation scheme and a heterogeneous modulation scheme according to whether RWFs are used or not. The performance is presented in spectrum efficiency with respect to $E_c/N_t$ when signals are weighted with RWFs.

Referring to FIG. 9, solid lines indicate simulation results when RWFs are used, and dotted lines indicate simulation results when RWFs are not used. Lines marked with indicate signal transmission in 16QAM with R=3/8 at initial transmission and retransmission, while lines marked with X indicate signal transmission in 16QAM with R=3/8 at initial transmission and in QPSK with R=3/4 at retransmission. As noted, there is no performance difference between the initial transmission and the retransmission when the same modulation scheme is used. That is, when 16QAM is adopted at the initial transmission and the retransmission, a negligibly slight performance difference is observed even if RWFs are used (Diff_Weight). However, if different modulation schemes are used at the initial transmission and the retransmission, a very large performance difference results depending on whether RWFs are used or not. Given the same spectral efficiency, the performance difference between using RWFs (Diff_Weight) and not using RWFs (Even_Weight) is about 1.0 dB or greater in $E_c/N_t$. Accordingly, RWFs must be applied to initial transmission symbols and retransmission symbols when different modulation schemes are used.

Another consideration to be taken into account in using RWFs is that the RWFs vary according to a ratio of the numbers of available Walsh codes when different modulation schemes are used. For example, if 16QAM and QPSK are used at an initial transmission and a retransmission, respectively, as the ratio of the number of Walsh codes used for the retransmission to that of Walsh codes used for the initial transmission increases, an RWF assigned to 16QAM decreases, in order to achieve optimum performance. This is because the SNR of code symbols increases in proportion to the number of Walsh codes under the same channel environment, that is, when the same noise power is given. Thus, a channel reliability needs to be increased in proportion to the SNR for the same reason that an RWF is determined according to the SNR of a modulation symbol. In other words, if different symbol energy is assigned to each transmission scheme, the symbol energy difference needs to be reflected in RWFs. First of all, RWFs are calculated in Method 1, Method 2, or Method 3. An energy ratio for each modulation scheme is then reflected in the RWFs. Here, information about the number of Walsh codes used for each transmission is delivered to the receiving apparatus on a preset message channel or by signaling.

Figure 10:
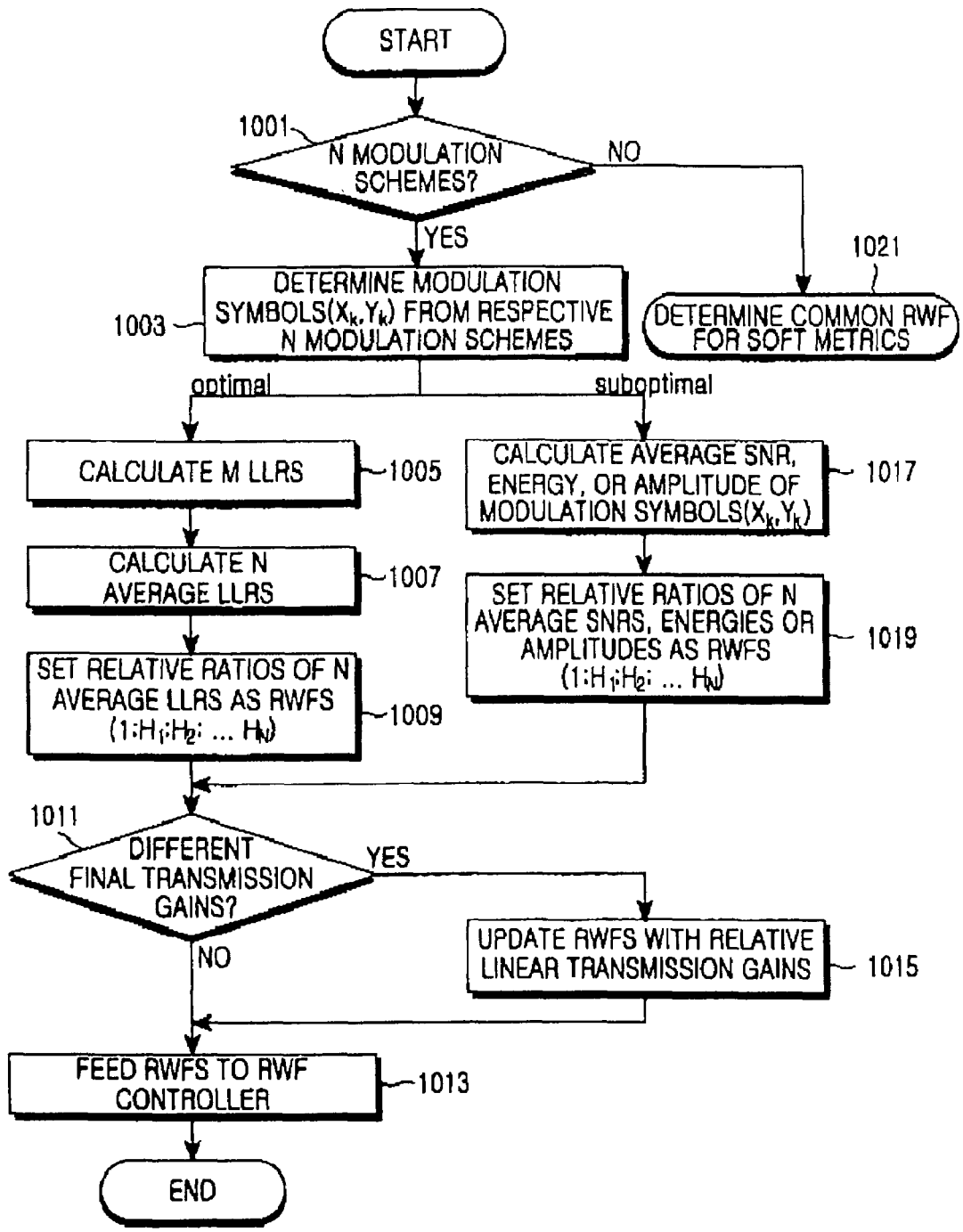
FIG. 10 is a flowchart illustrating an operation in a receiver for calculating RWFs for the soft metrics of demodulated symbols in a heterogeneous modulation-based system according to the embodiment of the present invention.

FIG. 10 is a flowchart illustrating an operation in a receiving apparatus for calculating RWFs to be assigned to the soft metrics of modulation symbols in the heterogeneous modulation-based system according to the embodiment of the present invention. RWFs are obtained in an optimal method based on LLRs or in a sub-optimal method based on SNR, energy or amplitude. This procedure is performed in the RWF calculator 503.

Figure 1:
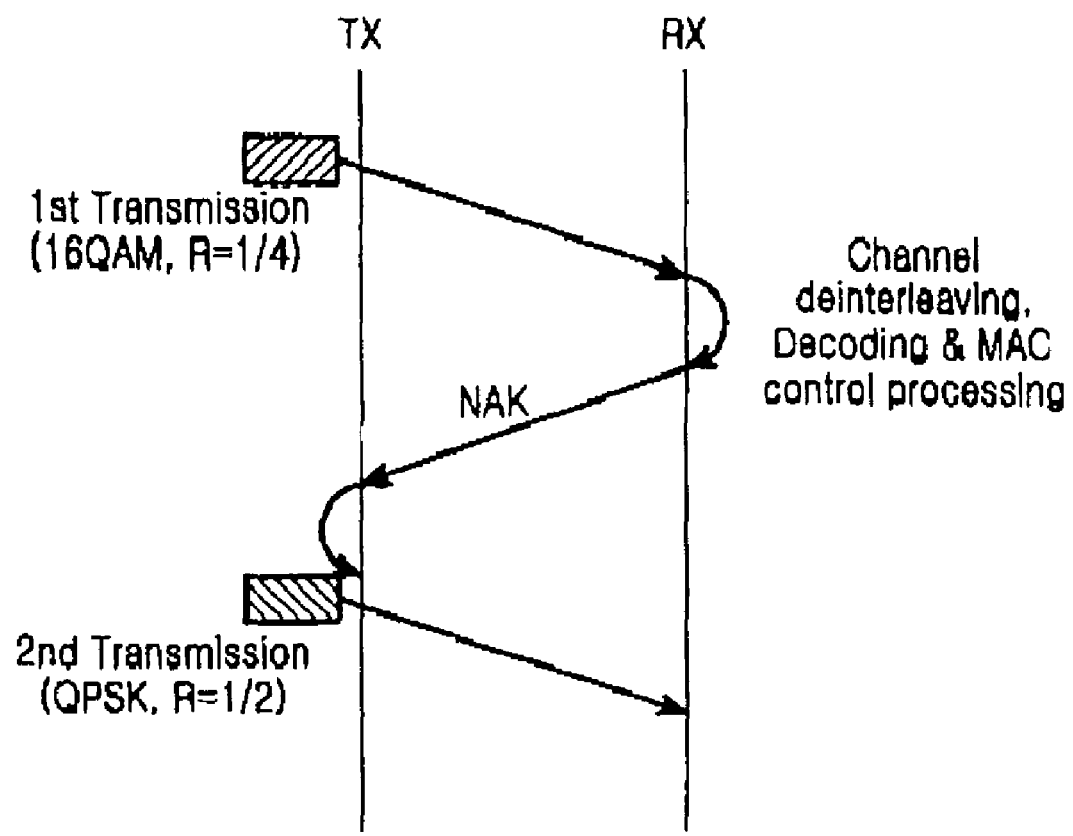
FIG. 1 illustrates data retransmission using a different modulation and a different code rate for each transmission in a communication system using a retransmission scheme.
Figure 2:
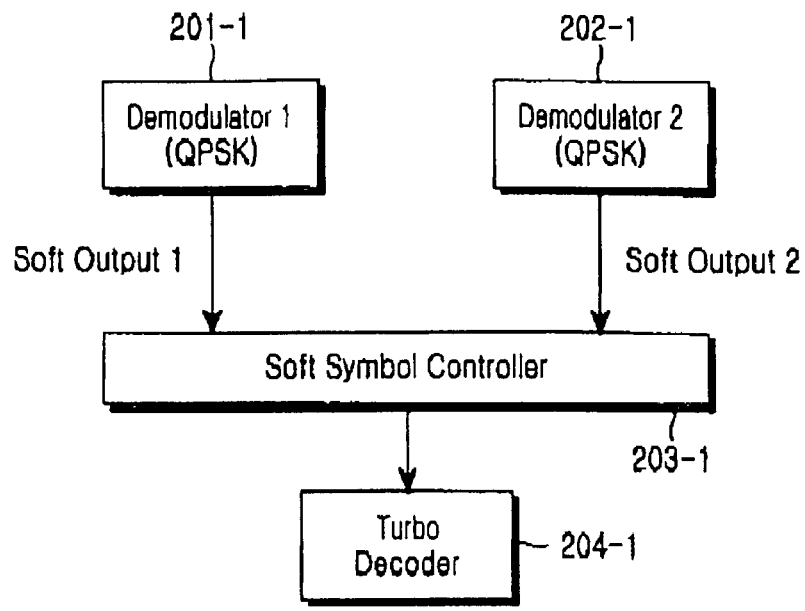
FIG. 2 is a block diagram of a conventional receiver that operates according to a homogeneous modulation scheme.
Figure 3:
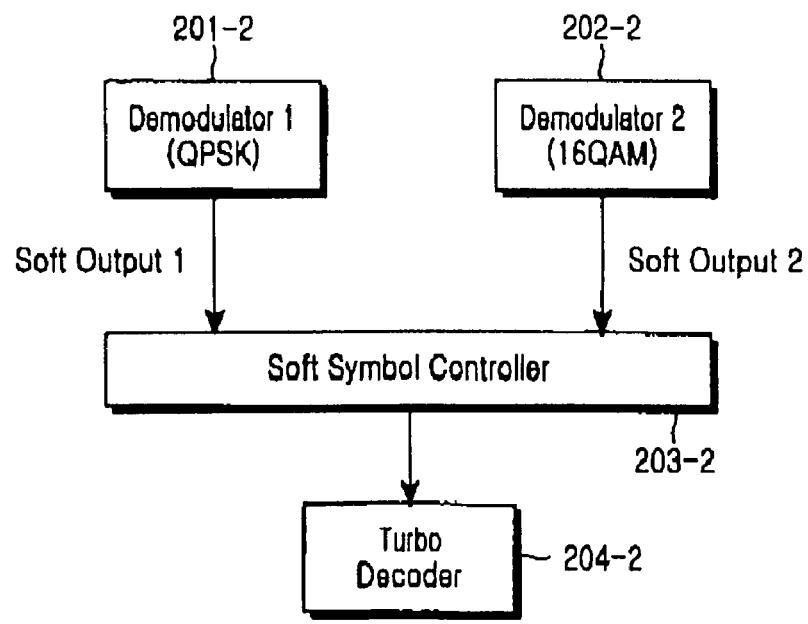
FIG. 3 is a block diagram of a conventional receiver that operates according to a heterogeneous modulation scheme.

Referring to FIG. 3, the RWF calculator 503 determines whether different modulation schemes are used in step 1001. If different modulation schemes are used, i.e., a heterogeneous modulation scheme, the procedure goes to step 1003. On the other hand, for a homogeneous modulation scheme, which implies that a plurality of demodulators use the same modulation scheme, the RWF calculator 503 determines an RWF to be commonly assigned to soft metrics from the demodulators and feeds the RWF to the RWF controller 501 in step 1021.

In step 1003, the RWF calculator 503 starts to calculate RWFs using modulation symbols $(X_k, Y_k)$ from N modulation schemes. A modulation symbol is represented by M code bits $(s_0, s_1, \ldots, s_{M-1})$. The RWF calculator 503 calculates the LLRs $(LLR(i)_0, LLR(i)_1, \ldots, LLR(i)_{M-1})$ of M code bits $(s_0, s_1, \ldots, s_{M-1})$ in a modulation symbol from each modulation scheme in step 1005. Needless to say, modulation symbols are randomly selected to thereby obtain average modulation symbols for the respective modulation schemes. The LLRs may be computed arithmetically, or statistically by simulation.

The RWF calculator 503 calculates the average of the M LLRs for each modulation scheme, Avg_LLR(1), Avg_LLR(2), Avg_LLR(3), ..., Avg_LLR(N) in step 1007. In step 1009, the RWF calculator 503 calculates a relative ratio of the N average LLRs. For example, if the average LLR for QPSK is Avg_LLR(1), relative ratios of the other average LLRs to the average LLR for QPSK (Avg_LLR(i)/Avg_LLR(QPSK) are calculated to 1:$H_1$:$H_2$: . . . :$H_N$, and are set as RWFs. While it has been described that the RWFs are calculated, RWFs mapped to combinations of modulation schemes can be preset and stored in a memory.

In step 1011, the RWF calculator 503 compares the final transmission gains of the N modulation schemes. The final transmission gain is influenced by the number of Walsh codes. In other words, the final transmission gain can be estimated using the number of Walsh codes used for transmission. The receiving apparatus receives information about the number of Walsh codes used for each transmission from the transmitting apparatus (usually a base station) on a message channel or by signaling. If the final transmission gains are equal, the RWF calculator 503 feeds the RWFs to the RWF controller 412 in step 1013. If the final transmission gains are different, the RWF calculator 503 multiplies the linear value of the relative transmission gain of each modulation scheme by a corresponding RWF and determines the product to be a new RWF for the modulation scheme in step 1015. The above LLR-based RWF calculation is an optimal method.

Now a sub-optimal RWF calculating method based on SNR, energy, or amplitude will be described.

The RWF calculator 503 starts to calculate RWFs using modulation symbols $(X_k, Y_k)$ from the N modulation schemes in step 1003. In step 1007, the RWF calculator 503 calculates the average SNR, energy or amplitude of the modulation symbols $(X_k, Y_k)$. The RWF calculator 503 calculates relative ratios of the average values, $1:H_1: H_2: \ldots :H_N$, and sets the relative ratios as RWFs in step 1019. Then the procedure goes to step 1011.

In the embodiment of the present invention, the average LLR of a modulation symbol from each modulation scheme, or the average SNR, energy or amplitude of the modulation symbol is calculated. Then RWFs are obtained from a relative ratio of the average values. If each modulation scheme has a different transmission gain for transmission symbols, the RWFs are updated by multiplying the RWFs by transmission gains.

In accordance with the present invention as described above, soft metrics output from a plurality of demodulators are weighted with RWFs in soft symbol combining in a receiver in a heterogeneous modulation-based system. Therefore, the decoding performance of a channel decoder after the soft symbol combining is optimized.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of soft combining demodulated symbols in a mobile communication system including a transmitting apparatus that modulates symbols in different modulation schemes and a receiving apparatus that demodulates the modulation symbols in correspondence with the different modulation schemes, the method comprising the steps of:
   determining weighting factors for the different modulation schemes;
   multiplying the demodulated symbols by the weighting factors;
   comparing transmission gains of the modulation symbols from the different modulation schemes, which transmission gains are determined using a number of Walsh codes used for each of the modulation symbols; and
   resetting the weighting factors with the transmission gains, if the transmission gains are different.

2. The method of claim 1, further comprising the step of combining the multiplied demodulated symbols.

3. The method of claim 1, wherein the weighting factors are reliability weighting factors (RWFs).

4. The method of claim 1, wherein the weighting factors are predetermined values.

5. A method of combining demodulated symbols in a mobile communication system including a transmitting apparatus that modulates symbols in different modulation schemes and a receiving apparatus that demodulates the modulation symbols in correspondence with the different modulation schemes, the method comprising the steps of:
   calculating a log likelihood ratio (LLR) of a modulation symbol from each of the different modulation schemes;
   determining relative ratios of the LLRs to be weighting factors for the different modulation schemes;
   multiplying soft metrics of the demodulated symbols by the weighting factors;
   combining the multiplied soft metrics;
   comparing transmission gains of the modulation symbols from the different modulation schemes, which transmission gains are determined using a number of Walsh codes used for each of the modulation symbols; and
   resetting the weighting factors with the transmission gains, if the transmission gains are different.

6. The method of claim 5, wherein the LLR calculation step comprises the steps of:
   calculating the LLRs of coded bits mapped to a modulation symbol from each of the different modulation schemes;
   calculating an average of the LLRs; and
   setting the average LLR as the LLR for the different modulation schemes.

7. A method of combining demodulated symbols in a mobile communication system including a transmitting apparatus that modulates symbols in different modulation schemes and a receiving apparatus that demodulates the modulation symbols in correspondence with the different modulation schemes, the method comprising the steps of:
   calculating a signal to noise ratio (SNR) of a modulation symbol from each of the different modulation schemes;
   determining relative ratios of the SNRs to be weighting factors for the different modulation schemes;
   multiplying soft metrics of the demodulated symbols by the weighting factors;
   combining the multiplied soft metrics;
   comparing transmission gains of the modulation symbols from the different modulation schemes, which transmission gains are determined using a number of Walsh codes used for each of the modulation symbols; and
   resetting the weighting factors with the transmission gains, if the transmission gains are different.

8. A method of combining demodulated symbols in a mobile communication system including a transmitting apparatus that modulates symbols in different modulation schemes and a receiving apparatus that demodulates the modulation symbols in correspondence with the different modulation schemes, the method comprising the steps of:
   calculating an energy of a modulation symbol from each of the different modulation schemes;
   determining relative ratios of the energies to be weighting factors for the different modulation schemes;
   multiplying soft metrics of the demodulated symbols by the weighting factors;
   combining the multiplied soft metrics;
   comparing transmission gains of the modulation symbols from the different modulation schemes, which transmission gains are determined using a number of Walsh codes used for each of the modulation symbols; and
   resetting the weighting factors with the transmission gains, if the transmission gains are different.

9. A method of combining demodulated symbols in a mobile communication system including a transmitting apparatus that modulates symbols in different modulation schemes and a receiving apparatus that demodulates the modulation symbols in correspondence with the different modulation schemes, the method comprising the steps of:
   calculating an amplitude of a modulation symbol from each of the different modulation schemes;
   determining relative ratios of the amplitudes to be weighting factors for the different modulation schemes;
   multiplying soft metrics of the demodulated symbols by the weighting factors;
   combining the multiplied soft metrics;
   comparing transmission gains of the modulation symbols from the different modulation schemes, which transmission gains are determined using a number of Walsh codes used for each of the modulation symbols; and resetting the weighting factors with the transmission gains, if the transmission gains are different.

10. An apparatus for soft combining demodulated symbols in a mobile communication system including a transmitting apparatus that modulates symbols in different modulation schemes and a receiving apparatus that demodulates the modulation symbols in correspondence with the different modulation schemes, the apparatus comprising:

a reliability weighting factor calculator for calculating weighting factors for the different modulation schemes; and a weighting factor controller for multiplying the demodulated symbols by the weighting factors, wherein the weighting factor calculator compares transmission gains of modulation symbols from the different modulation schemes, and resets the weighting factors with the transmission gains, if the transmission gains are different, and further wherein the transmission gains of the modulation symbols are determined using a number of Walsh codes used for each of the modulation symbols.

11. The apparatus of claim 10, further comprising a soft symbol controller for combining the multiplied demodulated symbols.

12. An apparatus for combining demodulated symbols in a mobile communication system including a transmitting apparatus that modulates symbols in different modulation schemes and a receiving apparatus that demodulates the modulation symbols in correspondence with the different modulation schemes, the apparatus comprising:

a weighting factor calculator for calculating a log likelihood ratio (LLR) of a modulation symbol from each of the different modulation schemes and determining relative ratios of the LLRs to be weighting factors for the different modulation schemes;

a weighting factor controller for multiplying soft metrics of the demodulated symbols by the weighting factors; and a soft symbol controller for combining the multiplied soft metrics, wherein the weighting factor calculator compares transmission gains of modulation symbols from the different modulation schemes, and resets the weighting factors with the transmission gains, if the transmission gains are different, and further wherein the transmission gains of the modulation symbols are determined using a number of Walsh codes used for each of the modulation symbols.

13. The apparatus of claim 12, wherein the weighting factor calculator calculates the LLRs of coded bits mapped to the modulation symbol from each of the different modulation schemes, calculates an average of the LLRs, and sets the average LLR as the LLR for the different modulation schemes.

14. An apparatus for combining demodulated symbols in a mobile communication system including a transmitting apparatus that modulates symbols in different modulation schemes and a receiving apparatus that demodulates the modulation symbols in correspondence with the different modulation schemes, the apparatus comprising:

a weighting factor calculator for calculating a signal to noise ratio (SNR) of a modulation symbol from each of the different modulation schemes and determining relative ratios of the SNRs to be weighting factors for the different modulation schemes;

a weighting factor controller for multiplying soft metrics of the demodulated symbols by the weighting factors; and a soft symbol controller for combining the multiplied soft metrics, wherein the weighting factor calculator compares transmission gains of the modulation symbols from the different modulation schemes, and resets the weighting factors with the transmission gains, if the transmission gains are different, and further wherein the transmission gains of the modulation symbols are determined using a number of Walsh codes used for each of the modulation symbols.

15. An apparatus for combining demodulated symbols in a mobile communication system including a transmitting apparatus that modulates symbols in different modulation schemes and a receiving apparatus that demodulates the modulation symbols in correspondence with the different modulation schemes, the apparatus comprising:

a weighting factor calculator for calculating an energy of a modulation symbol from each of the different modulation schemes and determining relative ratios of the energies to be weighting factors for the different modulation schemes;

a weighting factor controller for multiplying soft metrics of the demodulated symbols by the weighting factors; and a soft symbol controller for combining the multiplied soft metrics, wherein the weighting factor calculator compares transmission gains of modulation symbols from the different modulation schemes, and updates the weighting factors with the transmission gains, if the transmission gains are different, and further wherein the transmission gains of the modulation symbols are determined using a number of Walsh codes used for each of the modulation symbols.

16. An apparatus for combining demodulated symbols in a mobile communication system including a transmitting apparatus that modulates symbols in different modulation schemes and a receiving apparatus that demodulates the modulation symbols in correspondence with the different modulation schemes, the apparatus comprising:

a weighting factor calculator for calculating an amplitude of a modulation symbol from each of the different modulation schemes, and determining relative ratios of the amplitudes to be weighting factors for the different modulation schemes;

a weighting factor controller for multiplying soft metrics of the demodulated symbols by the weighting factors; and a soft symbol combiner for combining the multiplied soft metrics, wherein the weighting factor calculator compares transmission gains of modulation symbols from the different modulation schemes, and resets the weighting factors with the transmission gains, if the transmission gains are different, and further wherein the transmission gains of the modulation symbols are determined using a number of Walsh codes used for each of the modulation symbols.

* * * * *